(12) United States Patent
Lu

(10) Patent No.: US 11,281,323 B2
(45) Date of Patent: Mar. 22, 2022

(54) PRESSURE SENSING PANEL AND DISPLAY DEVICE

(71) Applicant: Shanghai Tianma Micro-Electronics Co., Ltd., Shanghai (CN)

(72) Inventor: Feng Lu, Shanghai (CN)

(73) Assignee: Shanghai Tianma Micro-Electronics Co., Ltd., Shanghai (CN)

( * ) Notice: Subject to any disclaimer, the term of this patent is extended or adjusted under 35 U.S.C. 154(b) by 316 days.

(21) Appl. No.: 16/724,405

(22) Filed: Dec. 23, 2019

(65) Prior Publication Data

US 2020/0142561 A1 May 7, 2020

(30) Foreign Application Priority Data

Jun. 28, 2019 (CN) .......................... 201910580650.0

(51) Int. Cl.
*G06F 3/041* (2006.01)
*G01B 7/16* (2006.01)

(52) U.S. Cl.
CPC ........... *G06F 3/04144* (2019.05); *G01B 7/18* (2013.01); *G06F 3/0412* (2013.01); *G06F 2203/04106* (2013.01)

(58) Field of Classification Search
CPC .................. G01B 7/18; G06F 3/04144; G06F 2203/04106
See application file for complete search history.

(56) References Cited

U.S. PATENT DOCUMENTS

2012/0162122 A1* 6/2012 Geaghan ................. G06F 3/047
345/174

* cited by examiner

*Primary Examiner* — Priyank J Shah
(74) *Attorney, Agent, or Firm* — Kilpatrick Townsend & Stockton, LLP

(57) ABSTRACT

The present disclosure discloses a pressure sensing panel and a display device. A strain sensing unit includes a switching transistor, a first resistive pressure sensing electrode and a second resistive pressure sensing electrode. The first reference voltage line and the second reference voltage line have a potential difference when the switching transistor is switched on. When the pressure sensing panel is deformed, the resistances of the first resistive pressure sensing electrode and the second resistive pressure sensing electrode change due to deformation of the first resistive pressure sensing electrode and the second resistive pressure sensing electrode at corresponding positions, which leads to a change in voltage between the first resistive pressure sensing electrode and the second resistive pressure sensing electrode. Then voltage signals output through the signal reading line will change, and deformation of the pressure sensing panel can be obtained through analyzing the output voltage signal.

19 Claims, 11 Drawing Sheets

PRESSURE SENSING PANEL AND DISPLAY DEVICE

CROSS REFERENCE TO RELATED APPLICATION

This application claims priority to Chinese Patent Application No. 201910580650.0, filed with the Chinese Patent Office on Jun. 28, 2019. The entire disclosure of the above application is incorporated herein by reference.

FIELD

The present disclosure relates to the field of sensors, in particular to a pressure sensing panel and a display device.

BACKGROUND

In recent years, as monitoring elements for such devices as robots, wearable devices and flexible display screens, strain sensors for monitoring expansion strain have been widely used. In the prior art, deformation is usually detected through multiple sensing elements, and distance change between a sensing element and other sensing elements is detected based on the electromagnetic force by the sensing element. However, the sensing element which detects based on the electromagnetic force is easily disturbed by external environment, for example, when a magnetic field exists in the periphery, detection results of the sensing element will be greatly influenced.

SUMMARY

An embodiment of the present disclosure provides a pressure sensing panel and a display device.

An embodiment of the present disclosure provides a pressure sensing panel. The pressure sensing panel includes: a first flexible substrate and a second flexible substrate disposed oppositely; and strain sensing units, a first reference voltage line, a second reference voltage line, signal reading lines and scanning lines disposed on a side, facing the second flexible substrate, of the first flexible substrate or disposed on a side, facing the first substrate, of the second flexible substrate. The plurality of strain sensing units are arranged in a matrix, each of the signal reading lines is electrically connected with each column of strain sensing units in a one-to-one corresponding manner, and each of the scanning lines is electrically connected with each row of strain sensing units in a one-to-one corresponding manner. Each of the plurality of strain sensing unit comprises: a switching transistor, a first resistive pressure sensing electrode and a second resistive pressure sensing electrode. A first end of the first resistive pressure sensing electrode is respectively electrically connected with a first end of the second resistive pressure sensing electrode and a first electrode of the switching transistor; one of a second end of the first resistive pressure sensing electrode and a second end of the second resistive pressure sensing electrode is electrically connected with the first reference voltage line, other one of the second end of the first resistive pressure sensing electrode and the second end of the second resistive pressure sensing electrode is electrically connected with the second reference voltage line; a gate of the switching transistor is electrically connected with a corresponding scanning line, and a second electrode of the switching transistor is electrically connected with a corresponding signal reading line. The first electrode is a source, and the second electrode is a drain; or, the first electrode is a drain, and the second electrode is a source. A potential difference exists between the first reference voltage line and the second reference voltage line when the switching transistor is switched on; and in each of the plurality of strain sensing units, the first resistive pressure sensing electrode is arranged on the side, facing the second flexible substrate, of the first flexible substrate, and the second resistive pressure sensing electrode is arranged on the side, facing the first flexible substrate, of the second flexible substrate.

Correspondingly, an embodiment of the present disclosure provides a display device. The display device includes the above pressure sensing panel provided in an embodiment of the present disclosure.

According to the above pressure sensing panel and the display device provided in the embodiments of the present disclosure, the strain sensing unit includes a switching transistor, a first resistive pressure sensing electrode and a second resistive pressure sensing electrode. The first reference voltage line and the second reference voltage line have a potential difference when the switching transistor is switched on. In this way, when the pressure sensing panel is deformed, the resistances of the first resistive pressure sensing electrode and the second resistive pressure sensing electrode change due to deformation of the first resistive pressure sensing electrode and the second resistive pressure sensing electrode at corresponding positions, which leads to a change in voltage between the first resistive pressure sensing electrode and the second resistive pressure sensing electrode. Then voltage signals output by the switching transistor through the signal reading line will change, and deformation of the pressure sensing panel can be obtained through analyzing the voltage signal output by the signal reading line. Moreover, since the first resistive pressure sensing electrode and the second resistive pressure sensing electrode are arranged on different flexible substrates, the directions at which two flexible substrates bear a stress during deformation are opposite, therefore, sensitivity of the strain sensing unit is relatively high. In addition, according to the pressure sensing panel provided in the embodiments of the present disclosure, deformation is detected by resistance change due to the deformation, and thus is not influenced by a magnetic field in surrounding environment. Besides, according to the pressure sensing panel provided in the embodiments of the present disclosure, the structure of the strain sensing unit is simple, and lightening and thinning of the pressure sensing panel can be realized.

DETAILED DESCRIPTION OF THE EMBODIMENTS

Figure 1:
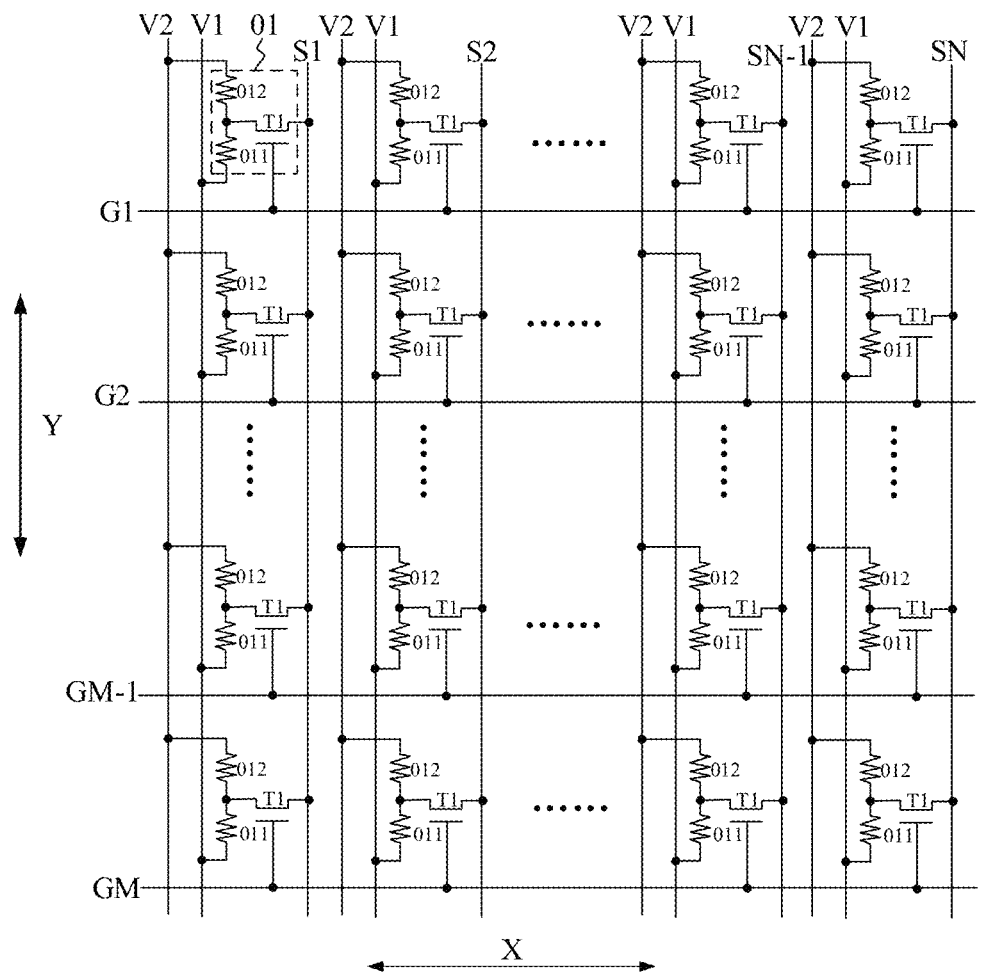
FIG. 1 is a structural schematic diagram of a circuit of a pressure sensing panel provided in some embodiments of the present disclosure.

The shape and size of each part in the drawings do not reflect real proportion, and are merely intended to illustrate contents of the present disclosure.

A detailed description will be given below on the present disclosure in combination with some embodiments. It should be noted that, the present embodiment is merely for a better understanding of the present disclosure, rather than for limiting the present disclosure.

Figure 2:
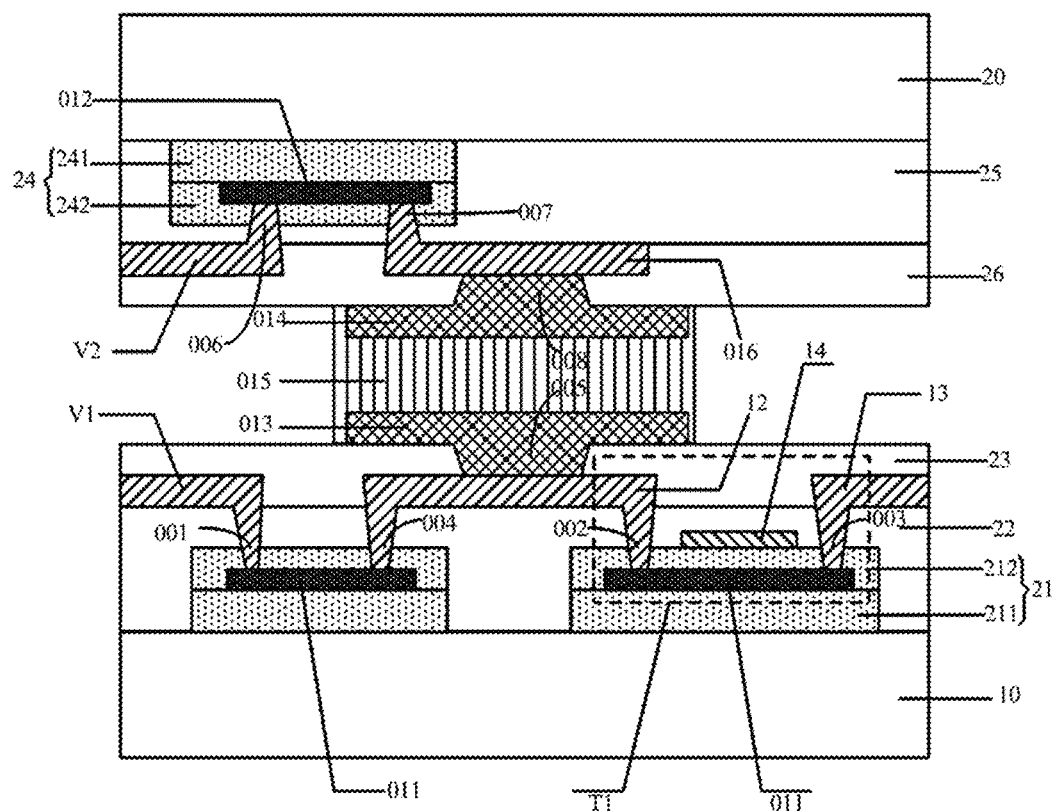
FIG. 2 is a cross-sectional view of a pressure sensing panel provided in some embodiments of the present disclosure.
Figure 3:
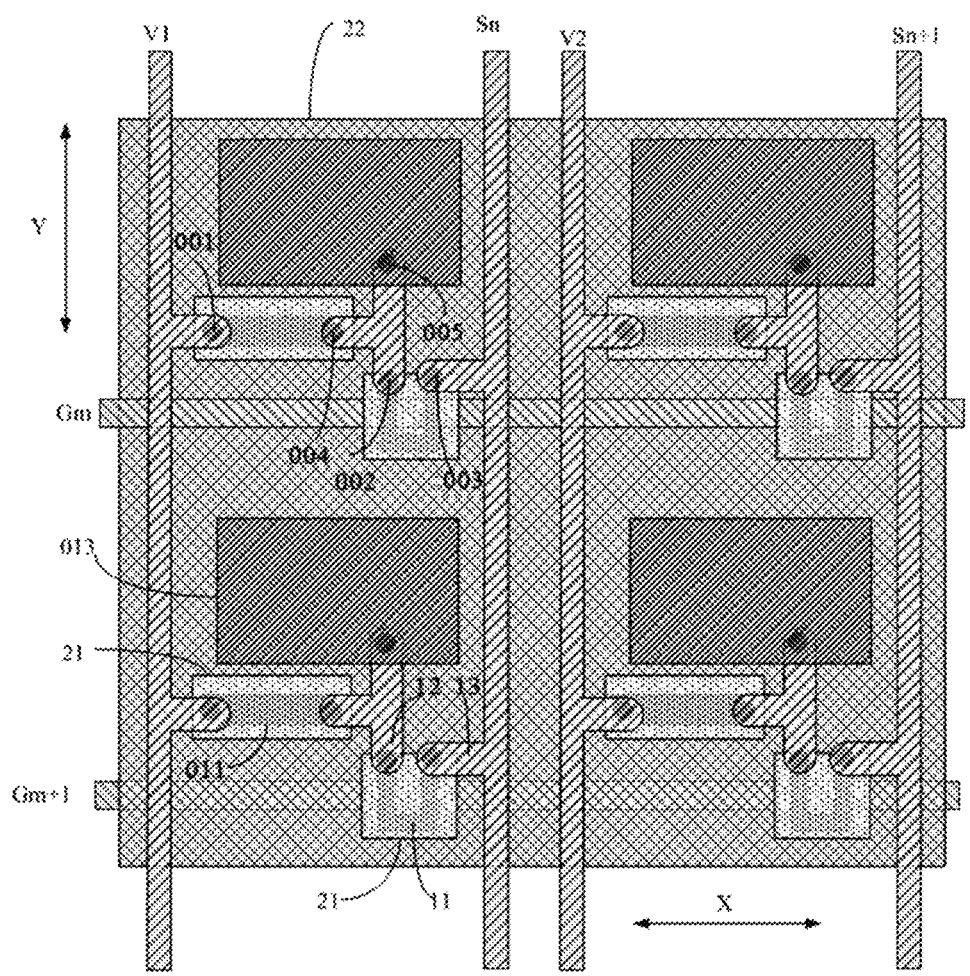
FIG. 3 is a top view of a first flexible substrate in a pressure sensing panel provided in some embodiments of the present disclosure.
Figure 4:
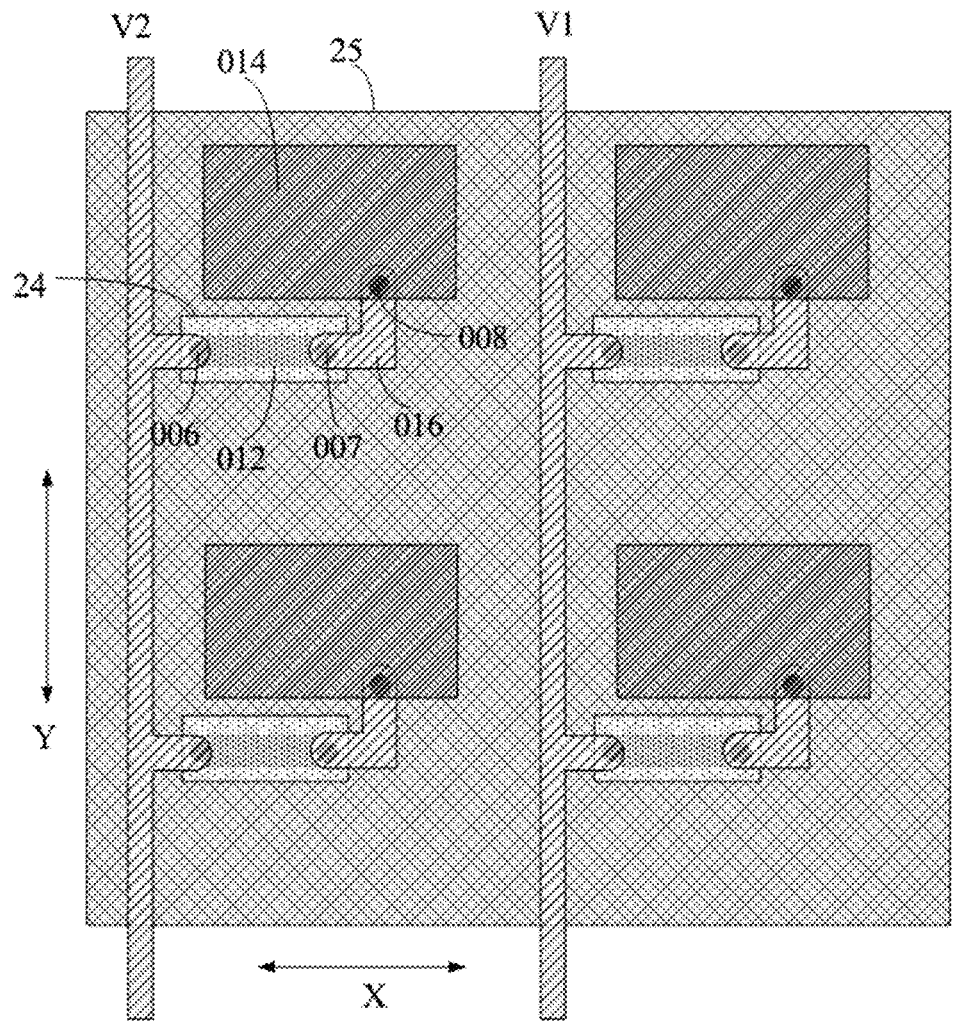
FIG. 4 is a top view of a second flexible substrate in a pressure sensing panel provided in some embodiments of the present disclosure.

As shown in FIG. 1 to FIG. 4, a pressure sensing panel is provided in an embodiment of the present disclosure. FIG. 1 is a structural schematic diagram of a circuit of a pressure sensing panel provided in some embodiments of the present disclosure, FIG. 2 is a cross-sectional view of a pressure sensing panel provided in some embodiments of the present disclosure, FIG. 3 is a top view of a first flexible substrate in a pressure sensing panel provided in some embodiments of the present disclosure, and FIG. 4 is a top view of a second flexible substrate in a pressure sensing panel provided in some embodiments of the present disclosure.

A pressure sensing panel includes: a first flexible substrate 10 and a second flexible substrate 20 disposed oppositely, and strain sensing units 01, first reference voltage lines V1, second reference voltage lines V2, signal reading lines Sn (n=1, 2, 3, . . . , N) and scanning lines Gm (m=1, 2, 3, . . . , M) arranged on a side, facing the second flexible substrate 20, of the first flexible substrate 10 or arranged on a side, facing the first substrate 10, of the second flexible substrate 20. The plurality of strain sensing units 01 are arranged in a matrix, the signal reading lines Sn are electrically connected with each column of strain sensing unit 01 in a one-to-one corresponding manner, and the scanning lines Gm are electrically connected with each row of strain sensing unit 01 in a one-to-one corresponding manner. Each strain sensing unit 01 includes: a switching transistor T1, a first resistive pressure sensing electrode 011 and a second resistive pressure sensing electrode 012.

A first end of the first resistive pressure sensing electrode 011 is respectively electrically connected with a first end of the second resistive pressure sensing electrode 012 and a first electrode of the switching transistor T1; one of a second end of the first resistive pressure sensing electrode 011 and a second end of the second resistive pressure sensing electrode 012 is electrically connected with the first reference voltage line V1, the other one thereof is electrically connected with the second reference voltage line V2; a gate of the switching transistor T1 is electrically connected with the scanning line Gm, and a second electrode of the switching transistor T1 is electrically connected with the signal reading line Sn.

There is a difference in electrical potential between the first reference voltage line V1 and the second reference voltage line V1 when the switching transistor T1 is switched on.

In the strain sensing unit 01, the first resistive pressure sensing electrode 011 is arranged on the side, facing the second flexible substrate 20, of the first flexible substrate 10; and the second resistive pressure sensing electrode 012 is arranged on the side, facing the first flexible substrate 10, of the second flexible substrate 20.

In the pressure sensing panel provided in embodiments of the present disclosure, the strain sensing unit includes a switching transistor, a first resistive pressure sensing electrode and a second resistive pressure sensing electrode. There is a difference in electrical potential between the first reference voltage line and the second reference voltage line when the switching transistor is switched on. As such, when a pressure sensing panel is deformed, the resistance of a first resistive pressure sensing electrode and a second resistive pressure sensing electrode at corresponding positions changes due to the deformation, which leads to a change in voltage between the first resistive pressure sensing electrode and the second resistive pressure sensing electrode, then voltage signal output by a switching transistor through a signal reading line will change, and the deformation information of the pressure sensing panel can be obtained through analyzing voltage signals output from the signal reading line. Moreover, since the first resistive pressure sensing electrode and the second resistive pressure sensing electrode are arranged on different flexible substrates, the directions at which two flexible substrates bear a stress during deformation are opposite, therefore, sensitivity of a strain sensing unit is relatively high. In addition, as to the pressure sensing panel provided in the embodiments of the present disclosure, deformation is detected by the resistance change due to deformation, and thus the detection is not influenced by a magnetic field in surrounding environment. Besides, as to the pressure sensing panel provided in an embodiment of the present disclosure, the structure of the strain sensing unit is simple, and lightening and thinning of a pressure sensing panel can be realized.

In addition, for example, in a case that a switching transistor is respectively connected to a first resistive pressure sensing electrode and a first reference voltage line through a source and a drain of the switching transistor, that is, the switching transistor is connected to a resistive pressure sensing electrode and a reference voltage signal source respectively. However the switching transistor will influence a current flowing between the resistive pressure sensing electrode and the reference voltage signal source, influence can be for example as follows: characteristics of the switching transistor itself have an influence on the current; moreover, the switching transistor may become a large source of noise due to such factors as influences of gate voltage fluctuation of the switching transistor, temperature and stress on the switching transistor, and threshold voltage of the switching transistor. Thus in this case, to-be-detected voltage signals at a test point between a first resistive pressure sensing electrode and a second resistive pressure sensing electrode will be influenced.

According to the present application, a switching transistor is arranged between a to-be-detected point and a signal reading line, and the signal reading line only detects voltage at the to-be-detected point. That is, current will not flow from a to-be-detected point to an external IC detection end since voltage detection is only performed between the to-be-detected point, which is between the first resistive pressure sensing electrode and the second resistive pressure sensing electrode, and an external IC detection end. Therefore, the switching transistor according to the present application will not influence detection results. A detection end generally needs to be in a high impedance state for detection of voltage (for example, the signal reading line is connected to an external detection circuit, e.g., connected to a multimeter, since a port of an external detection circuit for detecting voltage is generally of a high resistance, such as a pen-type multimeter; therefore, no current flows from a to-be-detected point to an external detection end, while the resistance of an external detection end in a high-resistance state is larger than an equivalent resistance of the switching transistor which is in an ON state), although a switching transistor is connected between a to-be-detected point and a signal reading line, its influence can be omitted, therefore, detection precision is relatively high according to the present application.

In some embodiments, in the pressure sensing panel according to the present disclosure, the first electrode of the switching transistor is a source, while the second electrode is a drain; or, the first electrode of the switching transistor is a drain, while the second electrode is the source, and this is not limited herein.

It should be noted that, in a pressure sensing panel according to embodiments of the present disclosure, one column of strain sensing units corresponds to one signal reading line, and each strain sensing unit in one column of strain sensing units is electrically connected with the corresponding signal reading line. Correspondingly, one row of strain sensing units corresponds to one scanning line, and each strain sensing unit in one row of strain sensing units is electrically connected to the corresponding scanning line.

It should be further noted that, in the embodiments of the present disclosure, A being disposed at one side of substrate B means that A is formed with substrate B as a substrate. In one embodiment, the first resistive pressure sensing electrode being disposed at one side, facing the second flexible substrate, of the first flexible substrate means that the first flexible substrate is taken as a substrate to form the first resistive pressure sensing electrode on one side, facing the second flexible substrate, of the first flexible substrate. A being disposed on substrate B also means that substrate B is taken as a substrate to form A. In the embodiments of the present disclosure, after such films as the electrode are respectively manufactured on the first flexible substrate and the second flexible substrate, the sides of the flexible substrates on which the electrode is disposed are placed to be opposite and are attached to form a pressure sensing panel.

Figure 5:
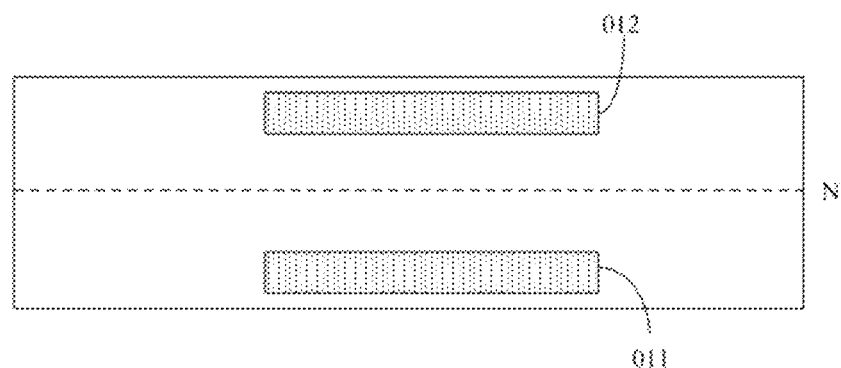
FIG. 5 is a schematic diagram showing relative positions of a first resistive pressure sensing electrode and a second resistive pressure sensing electrode relative to a neutral surface in some embodiments of the present disclosure.

As shown in FIG. 5, FIG. 5 is a schematic diagram showing relative positions of a first resistive pressure sensing electrode and a second resistive pressure sensing electrode relative to a neutral surface in one embodiment of the present disclosure. The same contents between the present embodiment and the above embodiment will not be repeated herein. The present embodiment differs from the above embodiment as follows: in a pressure sensing panel according to the present embodiment, a first resistive pressure sensing electrode 011 and a second resistive pressure sensing electrode 012 are respectively arranged at two sides of a neutral surface N of the pressure sensing panel. In this way, when the pressure sensing panel is deformed, the directions at which the first resistive pressure sensing electrode 011 and the second resistive pressure sensing electrode 012 bear a stress are opposite, to increase the difference in resistance between the first resistive pressure sensing electrode 011 and the second resistive pressure sensing electrode 012, and improve sensitivity of a pressure sensing panel.

It should be noted that, a neutral surface of the pressure sensing panel refers to a surface or a layer which maintains an initial length when the pressure sensing panel is bent. In one embodiment, when the pressure sensing panel is bent when being pressed, an uppermost layer is in an inward bending state, at this time, it is conceivable that one layer (namely, a neutral surface) which maintains an initial length exists, each layer above the neutral layer is in a compressed state, while each layer below the neutral layer is in a stretched state. It can be seen that, the neutral surface is a physical surface inherent to the pressure sensing panel, and when the pressure sensing panel is bent, no stress is applied to the neutral surface. In some embodiments, the position of the neutral surface can be calculated according to thickness of each film and Yong modulus. If the material of each layer is the same, then the neutral surface is approximately located at the position of a center of mass of a cross section of the pressure sensing panel.

Figure 6:
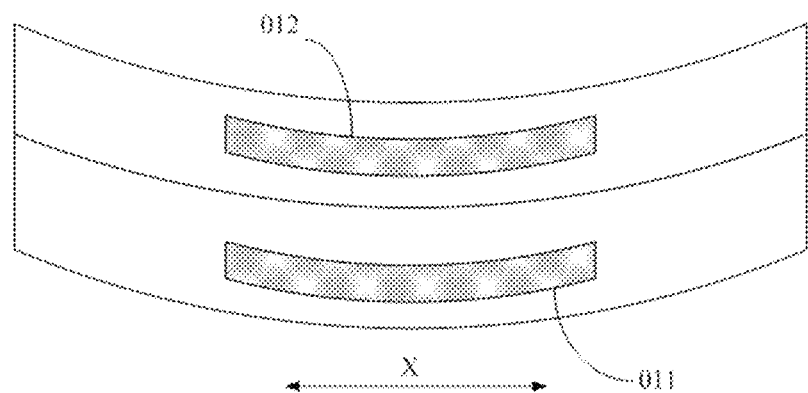
FIG. 6 is a schematic diagram showing bending of a pressure sensing panel provided in some embodiments of the present disclosure.

In some embodiments, as shown in FIG. 3 and FIG. 4, in a strain sensing unit 01, an extension direction of the first resistive pressure sensing electrode 011 is in parallel with an extension direction of the second resistive pressure sensing electrode 012. Please refer to FIG. 6. FIG. 6 is a schematic diagram showing bending of a pressure sensing panel according to an embodiment of the present disclosure, for example, the first resistive pressure sensing electrode 011 and the second resistive pressure sensing electrode 012 both extend along a row direction X, when a bend axis, about which the pressure sensing panel is bent, is along a column direction (the direction vertical to a paper in FIG. 6), deformation trends of the first resistive pressure sensing electrode 011 and the second resistive pressure sensing electrode 012 along a row direction X are the same, ensuring sensitivity of the pressure sensing panel.

In some embodiments, in the pressure sensing panel according to the present disclosure, in a strain sensing unit, an orthographic projection of the first resistive pressure sensing electrode on the first flexible substrate is overlapped with an orthographic projection of the second resistive pressure sensing electrode on the first flexible substrate. That is, the first resistive pressure sensing electrode and the second resistive pressure sensing electrode have the same shape, in this way, the variable quantity of the resistance is the same when the first resistive pressure sensing electrode and the second resistive pressure sensing electrode bear the same stress.

Figure 7:
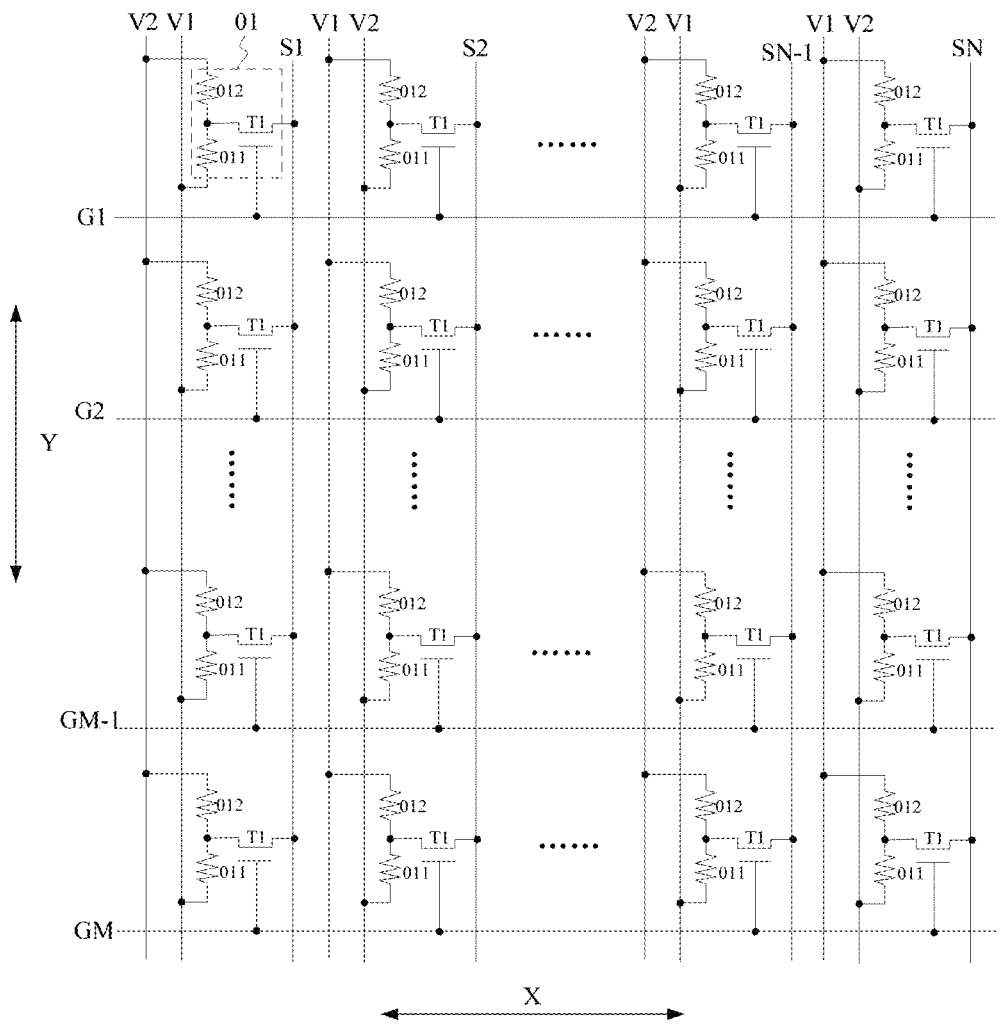
FIG. 7 is a structural schematic diagram of a circuit of a pressure sensing panel provided by another embodiments of the present disclosure.

In some embodiments, in a pressure sensing panel according to the present disclosure, as shown in FIG. 7, in any two adjacent strain sensing units 01 along the row direction X, a second end of a first resistive pressure sensing electrode 011 of one strain sensing unit 01 is electrically connected with the first reference voltage line V1, and a second end of a first resistive pressure sensing electrode 011 of the other strain sensing unit 01 is electrically connected with the second reference voltage line V2. In this way, two arbitrary adjacent strain sensing units 01 along the row direction X constitute a full-bridge type Wheatstone bridge structure, to detect deformation through the difference between voltage signals output via two corresponding signal reading lines, improving the signal to noise ratio of the pressure sensing panel.

In some embodiments, taking a pressure sensing panel shown in FIG. 1 as an example, in a strain sensing unit 01, a first resistive pressure sensing electrode 011 and a second resistive pressure sensing electrode 012 are connected in series, a first electrode of a switching transistor T1 is connected between the first resistive pressure sensing electrode 011 and the second resistive pressure sensing electrode 012, and the strain sensing unit 01 constitutes a half-bridge type Wheatstone bridge structure. Suppose that the voltage output by a signal reading line is $V_0$ when the strain sensing unit 01 is not deformed, and the voltage output by the signal reading line is $V_0 \pm \Delta V$ when the strain sensing unit 01 is deformed, a change rate of signals on the signal reading line is $\Delta V/V_0$, $V_0$ is much larger than $\Delta V$, therefore, $\Delta V/V_0$ is relatively small. Referring to FIG. 7, two arbitrary adjacent strain sensing units 01 along the row direction X constitute a full-bridge type Wheatstone bridge structure. Suppose when a strain sensing unit 01 is deformed, the changes of voltage output by two adjacent signal reading lines are respectively $+\Delta V$ and $-\Delta V$, a difference between voltage signals output by two signal reading lines is $2\Delta V$, then a change rate of a difference between voltage signals output by two signal reading lines is $2\Delta V/V$ compared with the difference between voltage signals output by two signal reading lines obtained when the strain sensing unit 01 is not deformed. Since V herein is approximate to 0, $2\Delta V/V$ is much larger than $\Delta V/V_0$. Therefore, in a case that two arbitrary adjacent strain sensing units 02 along the row direction X constitute a full-bridge type Wheatstone bridge structure, a signal to noise ratio of an array substrate is improved.

It should be noted that, in the pressure sensing panel according to the present disclosure, the column direction Y is a direction along which a signal reading line Sn extends, and the row direction X is a direction along which a scanning line Gm extends.

Figure 8:
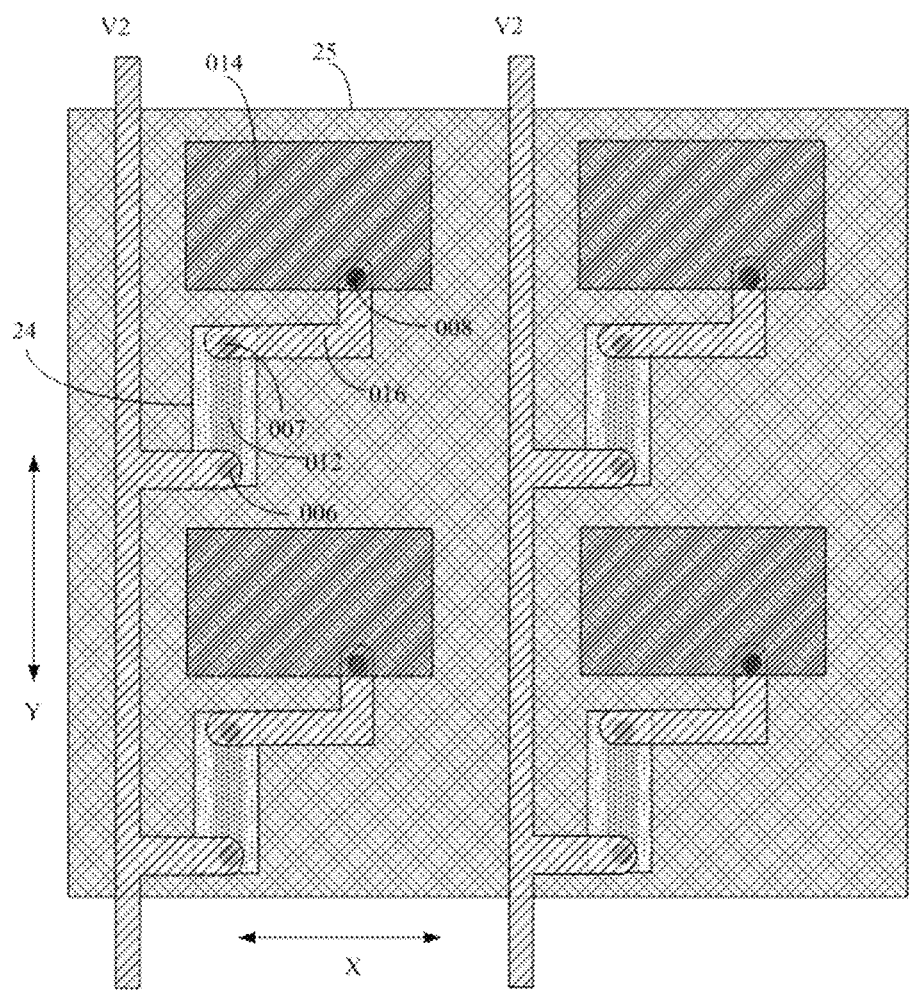
FIG. 8 is a top view of a second flexible substrate in a pressure sensing panel provided in another embodiments of the present disclosure.

In some embodiments, in a pressure sensing panel according to the present disclosure, in a strain sensing unit 01, an extension direction of the first resistive pressure sensing electrode 011 is vertical to an extension direction of the second resistive pressure sensing electrode 012, and this is not limited herein. In one embodiment, in combination with FIG. 3 and FIG. 8, which are top views of a first flexible substrate and a second flexible substrate respectively in a pressure sensing panel provided in some embodiments of the present disclosure, a first resistive pressure sensing electrode 011 extends along the row direction X, and a second resistive pressure sensing electrode 012 extends along the direction Y.

In some embodiments, when the extension direction of the first resistive pressure sensing electrode 011 is vertical to the extension direction of the second resistive pressure sensing electrode 012, an orthographic projection of the first resistive pressure sensing electrode 011 on the first flexible substrate 10 and an orthographic projection of the second resistive pressure sensing electrode 012 on the first flexible substrate 10 have an overlapping field. As such, stress and bending change on each direction can be detected at the same position.

Figure 9:
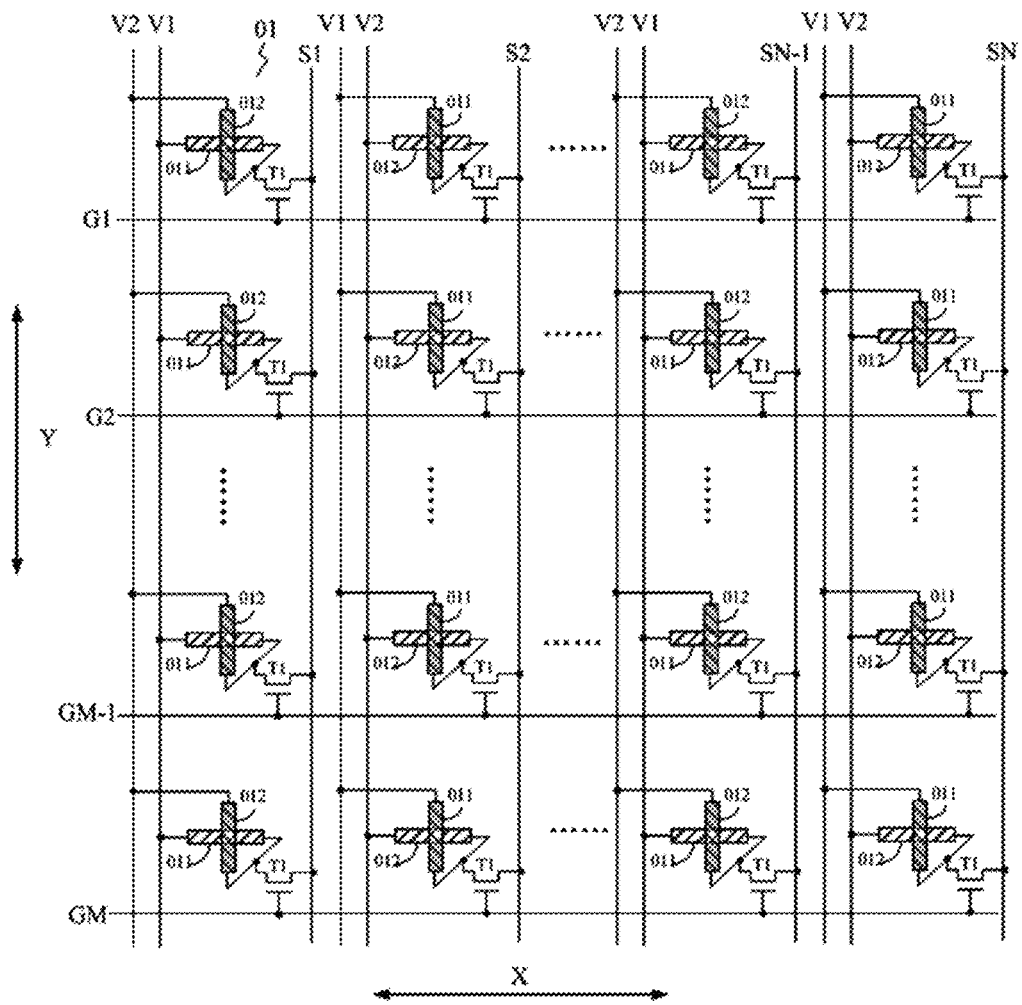
FIG. 9 is a structural schematic diagram of a circuit of a pressure sensing panel provided by yet another embodiments of the present disclosure.

In some embodiments, in a pressure sensing panel according to the present disclosure, as shown in FIG. 9 which is a structural schematic diagram of a circuit of a pressure sensing panel according to some embodiments, in a strain sensing unit 01, a second end of the first resistive pressure sensing electrode 011 is electrically connected with the first reference voltage line V1, and a second end of the second resistive pressure sensing electrode 012 is electrically connected with the second reference voltage line V2.

In two arbitrary adjacent strain sensing units 01 along the row direction X, extension directions of two first resistive pressure sensing electrodes 011 are vertical. As such two arbitrary adjacent strain sensing units 01 along a row direction X constitute a full-bridge type Wheatstone bridge structure, to improve the signal to noise ratio of the array substrate.

In some embodiments, in a pressure sensing panel according to present disclosure, a first reference voltage provided by the first reference voltage line is a high voltage at least when the switching transistor is switched on, and a second reference voltage provided by the second reference voltage line is a low voltage.

In another embodiments, the first reference voltage provided by the first reference voltage line is a low voltage, and the second reference voltage provided by the second reference voltage line is a high voltage at least when the switching transistor is switched on.

In some embodiments, in a pressure sensing panel according to the present disclosure, a low voltage can be a grounding voltage, and can also be any voltage lower than a high voltage, and this is not limited herein.

In some embodiments, in a pressure sensing panel according to the present disclosure, when the first reference voltage (or the second reference voltage) is a high voltage at least when the switching transistor is switched on, the high voltage is a direct current high voltage, or a square-wave pulse voltage. The pulse voltage can only be at a high level when the switching transistor is switched on, and this is not limited herein. Further, when the reference voltage is a square-wave pulse voltage, power consumption of the pressure sensing panel can be reduced.

In some embodiments, in a pressure sensing panel according to the present disclosure, the shapes of the first resistive pressure sensing electrode and the second resistive pressure sensing electrode are not limited. The first resistive pressure sensing electrode and the second resistive pressure sensing electrode both can be of any shape, such as strip, which can be linear strip, broken-line strip or wavy strip, and this is not limited herein.

In some embodiments, in a pressure sensing panel according to the present disclosure, the shape of the first resistive pressure sensing electrode is the same as the shape of the second resistive pressure sensing electrode. As such, a coefficient of variation of a resistance along with strain is not influenced by the shape of an electrode.

Generally the resistance of the resistive pressure sensing electrode can be influenced by ambient temperature. That is, when the temperature of the resistive pressure sensing electrode changes, the resistance will also change. Therefore, in order to prevent temperature from influencing detection results, materials with temperature effect being smaller than deformation effect can be adopted, meanwhile, the smaller the temperature effect is than the deformation effect, the higher the accuracy of a strain sensing unit is.

In some embodiments, in a pressure sensing panel according to the present disclosure, the materials of the first resistive pressure sensing electrode and the second resistive pressure sensing electrode are both low-temperature polysilicon materials. Since for low-temperature polysilicon materials, the variable quantity of the resistance caused by deformation is bigger than variable quantity of the resistance caused by temperature, and the process of low-temperature polysilicon materials is relatively mature, and product yield can be improved.

In the above embodiments, only the positions of the first resistive pressure sensing electrode and the second resistive pressure sensing electrode relative to a flexible substrate are limited. Next a brief description on the arrangements of the various films in a pressure sensing panel will be given below.

In some embodiments, in a pressure sensing panel according to the present disclosure, as shown in FIG. 2 and FIG. 3, the switching transistor T1 is disposed at a side, facing a second flexible substrate 20, of a first flexible substrate 10;

the material of an active layer 11 of the switching transistor T1 is low-temperature polysilicon material; and the active layer 11 and the first resistive pressure sensing electrode 011 are arranged in the same layer. In this way, the active layer 11 and the first resistive pressure sensing electrode 011 can be formed simultaneously through a one-time composition process, simplifying process steps and saving manufacturing cost.

In some embodiments, in a pressure sensing panel according to the present disclosure, as shown in FIG. 2 and FIG. 3, the reference voltage line V1 which is electrically connected with the second end of the first resistive pressure sensing electrode 011 (with the first reference voltage line V1 as an example in FIG. 2), the signal reading line Sn and the scanning line Gm are all disposed at the side, facing the second flexible substrate 20, of the first flexible substrate 10.

Here the reference voltage line V1 connected with the first resistive pressure sensing electrode 011, the first electrode 12 of the switching transistor T1 and the second electrode 13 of the switching transistor T2 are set to be in the same layer and of the same material. In this way, the reference voltage line V1, the first electrode 12 and the second electrode 13 can be formed simultaneously through a one-time composition process, simplifying process steps and saving manufacturing cost.

In some embodiments, in a pressure sensing panel according to the present disclosure, a region in which each strain sensing unit is located is taken as a pixel region. The length and width of the pixel region can be respectively set to be bigger than 50 μm, in this way, the change of resistance can be ensured to be read out when the first resistive pressure sensing electrode and a second resistive pressure sensing electrode are deformed.

In some embodiments, in a pressure sensing panel according to the present disclosure, the switching transistor is a bottom-gate transistor or a top-gate transistor, which is not limited herein. A bottom-gate transistor will be taken as an example for description below.

In some embodiments, in order to solve the problem of the pressure sensing panel being broken off by bending, as shown in FIG. 2 and FIG. 3, the pressure sensing panel provided in an embodiment of the present disclosure further includes:

a first inorganic insulating layer 21 which is disposed at the side, facing the second flexible substrate 20, of the first flexible substrate 10 and which has a pattern which is matched with the function layer, here the surface of the function layer is covered by the first inorganic insulating layer 21 and the function layer includes the first resistive pressure sensing electrode 011 and the active layer 11;

a first organic insulating layer 22 which covers the first inorganic insulating layer 21 and is filled in the blank areas of the first inorganic insulating layer 21.

Here the reference voltage line electrically connected with the second end of the first resistive pressure sensing electrode 011, the first electrode 12 of the switching transistor T1 and the second electrode 13 of the switching transistor T1 are respectively connected with a corresponding function layer through a via hole which penetrates through the first organic insulating layer 22 and the first inorganic insulating layer 21. In one embodiment, the function layer is of a low-temperature polysilicon material, and water oxygen from the outside need to be blocked, therefore, the inorganic insulating layer is only arranged outside a function layer. Since the organic insulating material has a better ductility and better resistance to bending compared with the inorganic insulating material, the organic insulating layer is filled in other regions which need to be insulated than that needs an inorganic insulating layer. Here the organic insulating layer is not in direct contact with the function layer, increasing flexibility of a pressure sensing panel, and preventing fracture of the function layer caused by cracking of the insulating material when the pressure sensing panel is deformed.

In some embodiments, as shown in FIG. 2, a first inorganic insulating layer 21 generally includes a first buffer layer 211 arranged below the function layer and a gate insulating layer 212 which covers the function layer. A gate 14 is arranged on one side, facing away from the active layer 11, of the gate insulating layer 212. As shown in FIG. 2 and FIG. 3, the first reference voltage line V1 is electrically connected with the first resistive pressure sensing electrode 011 through a first via hole 001 which penetrates through the first organic insulating layer 22 and the gate insulating layer 212. The first electrode 12 is electrically connected with the active layer 11 through a second via hole 002 which penetrates through the first organic insulating layer 22 and the gate insulating layer 212; the second electrode 13 is electrically connected with the active layer 11 through a third via hole 003 which penetrates through the first organic insulating layer 22 and the gate insulating layer 212; and the first electrode 12 is electrically connected with the first resistive pressure sensing electrode 011 through a fourth via hole 004 which penetrates through the first organic insulating layer 22 and the gate insulating layer 212.

In some embodiments, in a pressure sensing panel according to the present disclosure as shown in FIG. 1, the first reference voltage line V1, the second reference voltage line V1 and the signal reading line Sn all extend along the column direction Y.

Here each column of strain sensing units 01 respectively corresponds to one first reference voltage line V1 and one second reference voltage line V2. Since a driver chip is generally set at one end of the signal reading line Sn, the first reference voltage line V1 and the second reference voltage line V2 are set to be of the same extension direction as the signal reading line Sn, to connect a driver chip with the first reference voltage line V1 and the second reference voltage line V2.

In some embodiments, in a pressure sensing panel according to the present disclosure, as shown in FIG. 2 and FIG. 3, the reference voltage line V1 and the signal reading line Sn which are arranged on the side, facing the second flexible substrate 20, of the first flexible substrate 10 are set to be in the same layer and of the same material. In this way, the reference voltage line V1, the first electrode 12, the second electrode 13 and the signal reading line Sn can be formed simultaneously through a one-time composition process, simplifying process steps and saving manufacturing cost.

In some embodiments, a second organic insulating layer 23 is provided and the second organic insulating layer 23 is configured to cover the reference voltage line V1, the signal reading line Sn, the first electrode 12 of the switching transistor T1 and the second electrode 13 of the switching transistor T1 on a first flexible substrate 10.

In some embodiments of the present disclosure, as shown in FIG. 2 to FIG. 4, the pressure sensing panel further includes:

a first electrode lapping part 013 which is arranged on the side, facing the second flexible substrate 20, of the first flexible substrate 10 and which is electrically connected with the first end of the first resistive pressure sensing electrode 011;

a second electrode lapping part 014 which is arranged on the side, facing the first flexible substrate 10, of the second flexible substrate 20 and which is electrically connected with the first end of the second resistive pressure sensing electrode 012; and conductive adhesive 015 which is arranged between the first electrode lapping part 013 and the second electrode lapping part 014 and which electrically connects the first electrode lapping part 013 and the second electrode lapping part 014.

In some embodiments, the conductive adhesive is filled between the first flexible substrate and the second flexible substrate, i.e., the conductive adhesive is set in a whole surface between the first flexible substrate and the second flexible substrate. In another embodiments, conductive adhesive is filled between the first electrode lapping part and the second electrode lapping part. This is because the conductive adhesive includes conductive metal particles, and the hardness of the conductive adhesive layer with the conductive metal particles is relatively large, which is not beneficial for bending performance of a pressure sensing panel.

In some embodiments, in a pressure sensing panel according to the present disclosure, Young modulus of the conductive adhesive is respectively smaller than that of the first flexible substrate and that of the second flexible substrate. As such a neutral surface of the pressure sensing panel falls within the layer in which conductive adhesive is located, then the first resistive pressure sensing electrode and the second resistive pressure sensing electrode can be respectively arranged at two sides of the neutral surface.

In some embodiments, in a pressure sensing panel according to the present disclosure, as shown in FIG. 2 to FIG. 4, an orthographic projection of the first electrode lapping part 013 on the first flexible substrate 10 overlaps with an orthographic projection of the second electrode lapping part 014 on the first flexible substrate 10, ensuring that the first electrode lapping part 013 and the second electrode lapping part 014 have the biggest contact area, and further ensuring electrical conductivity.

In some embodiments, in a pressure sensing panel according to the present disclosure, as shown in FIG. 2 and FIG. 3, the first electrode lapping part 013 is arranged on a side, facing the second flexible substrate 20, of a second organic insulating layer 23. The first electrode lapping part 013 is electrically connected with the first electrode 12 of the switching transistor T1 through a fifth via hole 005 which penetrates through the second organic insulating layer 23.

In some embodiments, in a pressure sensing panel according to the present disclosure, as shown in FIG. 2 and FIG. 4, the pressure sensing panel further includes:

a second inorganic insulating layer 24 which is arranged on a side, facing the first flexible substrate 10, of the second flexible substrate 20, where the surface of the second resistive pressure sensing electrode 012 is covered by the second inorganic insulating layer 24 which has a pattern matched with the second resistive pressure sensing electrode 012;

a third organic insulating layer 25 which is filled in the blank areas of the second inorganic insulating layer 24 and covers the second inorganic insulating layer 24.

Here the reference voltage line electrically connected with the second end of the second resistive pressure sensing electrode 012 (with the second reference voltage line V2 as an example in FIG. 2) is disposed on a side, facing away from the second flexible substrate 20, of the third organic insulating layer 25. In some embodiments, the reference voltage line V2 electrically connected with the second end of the second resistive pressure sensing electrode 012 is connected with the second resistive pressure sensing electrode 012 through a sixth via hole 006 which penetrates through the third organic insulating layer 25 and the second inorganic insulating layer 24.

In one embodiment, since the second resistive pressure sensing electrode is of a low-temperature polysilicon material, and water oxygen from outside need to be blocked, the inorganic insulating layer is only arranged on the outside surface of the second resistive pressure sensing electrode. Since the organic insulating material has a better ductility and better resistance to bending compared with the inorganic insulating material, the organic insulating layer is filled in other regions which need to be insulated than that needs the inorganic insulating layer. The organic insulating layer is not in direct contact with the second resistive pressure sensing electrode, increasing flexibility of the pressure sensing panel, and preventing fracture of each electrode caused by cracking of an insulating material when a pressure sensing panel is deformed.

In some embodiments of the present disclosure, as shown in FIG. 2, the second inorganic insulating layer 24 generally includes a second buffer layer 241 arranged below the second resistive pressure sensing electrode 012 along a direction from the second flexible substrate to the first flexible substrate and an interlayer dielectric layer 242 which covers a function layer. The reference voltage line V2 which is electrically connected with the second end of the second resistive pressure sensing electrode 012 is connected with the second resistive pressure sensing electrode 012 through a sixth via hole 006 which penetrates through the third organic insulating layer 25 and the interlayer dielectric layer 242.

In some embodiments, in a pressure sensing panel according to the present disclosure, as shown in FIG. 2 and FIG. 4, when the pressure sensing panel includes the second electrode lapping part 014, the pressure sensing panel further includes:

an electrode connecting part 016 which is arranged to be in the same layer as the reference voltage line which is electrically connected with the second end of the second resistive pressure sensing electrode 012, where the electrode connecting part 016 is connected with the second resistive pressure sensing electrode 012 through a seventh via hole 007 which penetrates through the third organic insulating layer 25 and the second inorganic insulating layer 24; and a fourth organic insulating layer 26 which covers the electrode connecting part 016 and covers the reference voltage line V2 which is electrically connected with the second end of the second resistive pressure sensing electrode 012.

Here the second electrode lapping part 014 is arranged on a side, facing away from the second flexible substrate 20, of the fourth organic insulating layer 26, and the second electrode lapping part 014 is electrically connected with the electrode connecting part 016 through an eighth via hole 008 which penetrates through the fourth organic insulating layer 26.

Figure 10:
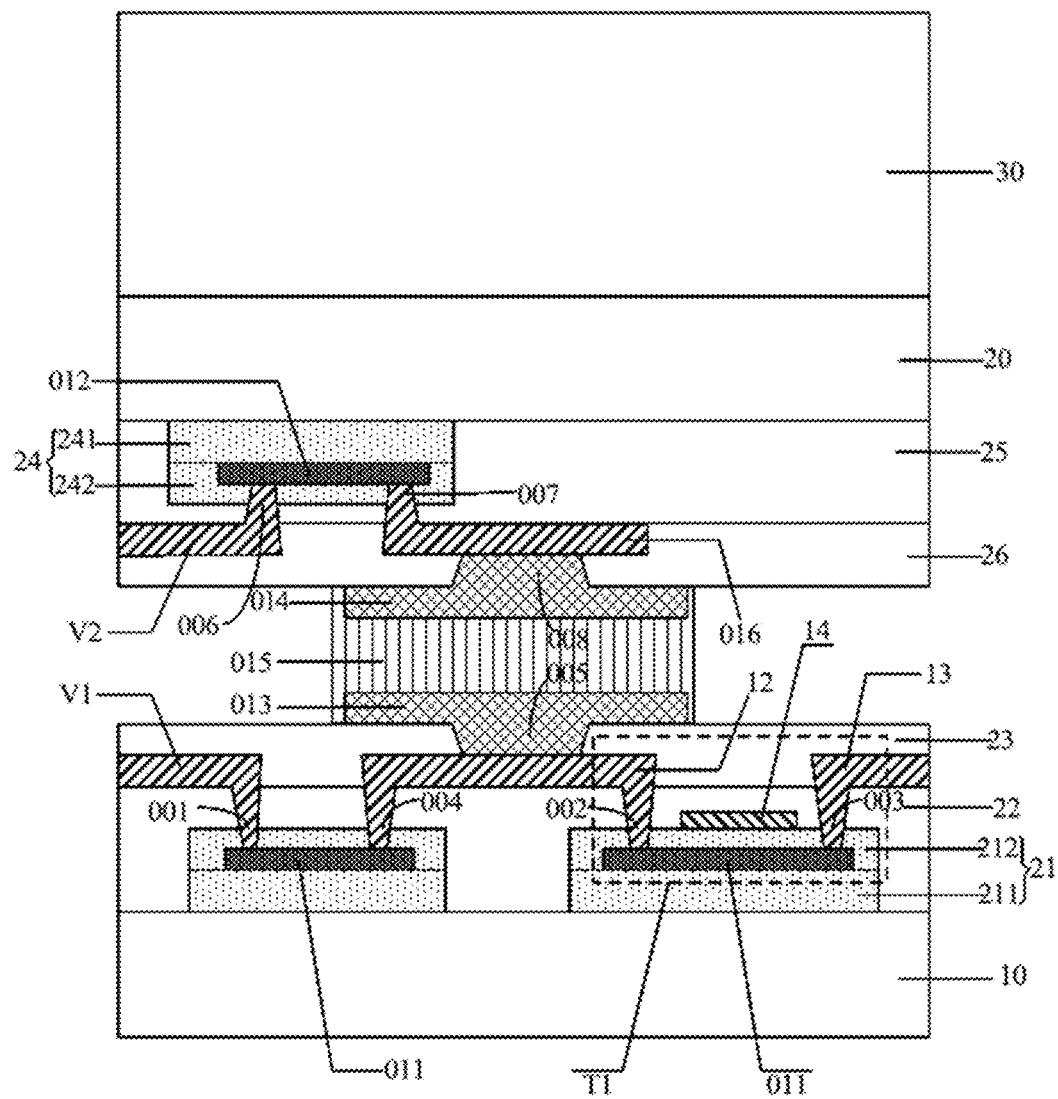
FIG. 10 is a cross-sectional view of a pressure sensing panel provided in another embodiments of the present disclosure.

In some embodiments, as shown in FIG. 10, the pressure sensing panel according to the present disclosure further includes a display panel 30.

In some embodiments, the display panel 30 includes a substrate. The substrate can be a flexible substrate, and is formed by polymers with a thinner thickness, such as polyimide. In some embodiments, the substrate includes a buffer layer. The buffer layer can include multiple layers of inorganic and organic laminated structures, to block oxygen and moisture, and prevent diffusion of moisture or impurities through a substrate, and a smooth surface is provided on an upper surface of the substrate. The structure of the substrate will not be repeated redundantly in the present disclosure.

The display panel 30 further includes an array layer which is arranged on one side, facing away from the strain sensing unit, of the substrate. The array layer includes multiple thin film transistors (TFTs), and a pixel circuit constituted by the TFTs and is configured to control organic light-emitting devices.

The display panel 30 further includes a light-emitting function layer arranged on a side, facing away from the substrate, of the array layer, and an encapsulating layer arranged on a side, facing away from the array layer, of the light-emitting function layer.

In some embodiments, the first flexible substrate or the second flexible substrate in above embodiments of the present application is reused as a substrate of the display panel, and is configured to carry an array layer, a light-emitting device, etc. Of course, in another embodiments of the present application, the first flexible substrate and the second flexible substrate are encapsulated with the strain sensing unit between the first flexible substrate and the second flexible substrate, and then the first flexible substrate and the second flexible substrate together form a substrate of the above display panel.

In one embodiment, the display panel 30 is disposed on a side, facing away from the first flexible substrate 10, of the second flexible substrate 20. In another embodiment, the display panel is disposed on a side, facing away from the second flexible substrate, of the first flexible substrate.

In some embodiments, in a pressure sensing panel according to the present disclosure, the display panel can be reused as a flexible substrate, in this way, thickness of the pressure sensing panel can be reduced.

Figure 11:
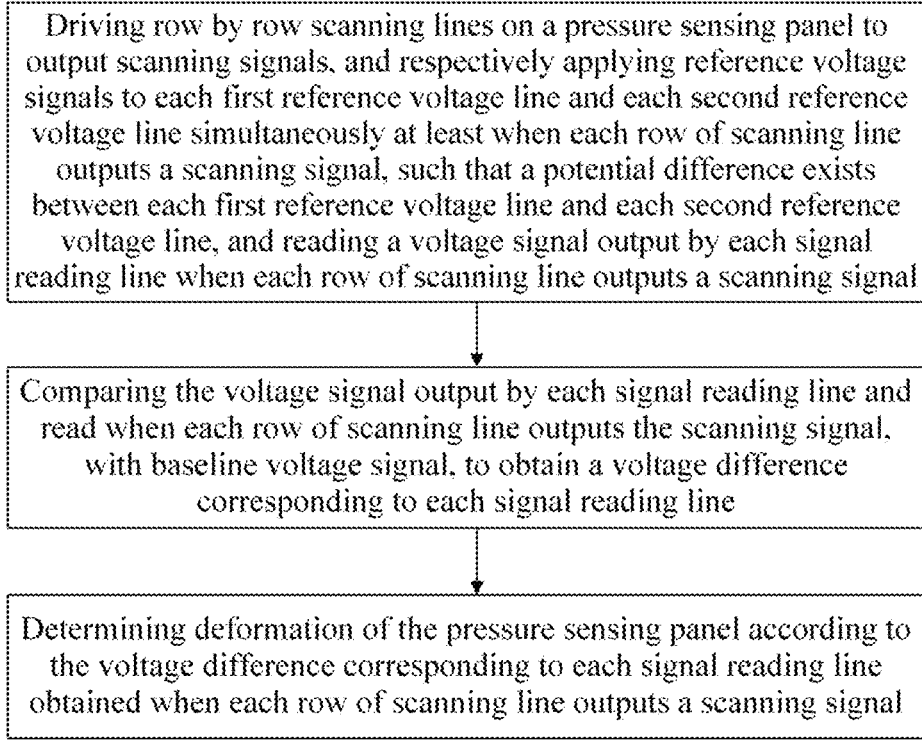
FIG. 11 is a flow schematic diagram of a driving method of an array substrate provided in some embodiments of the present disclosure.

Based on a same inventive concept, an embodiment of the present disclosure provides a driving method of the above pressure sensing panel. As shown in FIG. 11, the driving method includes the following steps.

S101: driving row by row scanning lines on a pressure sensing panel to output scanning signals, and respectively applying reference voltage signals to each first reference voltage line and each second reference voltage line simultaneously at least when each row of scanning line outputs a scanning signal, a potential difference exists between each first reference voltage line and each second reference voltage line, and reading a voltage signal output by each signal reading line when each row of scanning line outputs a scanning signal.

S102: comparing the voltage signal output by each signal reading line and read when each row of scanning line outputs the scanning signal, with baseline voltage signal, to obtain a voltage difference corresponding to each signal reading line.

S103: determining deformation of the pressure sensing panel according to the voltage difference corresponding to each signal reading line obtained when each row of scanning line outputs a scanning signal.

It should be noted that, each strain sensing unit respectively corresponds to one baseline voltage signal. The baseline voltage signal is a voltage signal output by the signal reading line when the strain sensing unit is not deformed.

Figure 12:
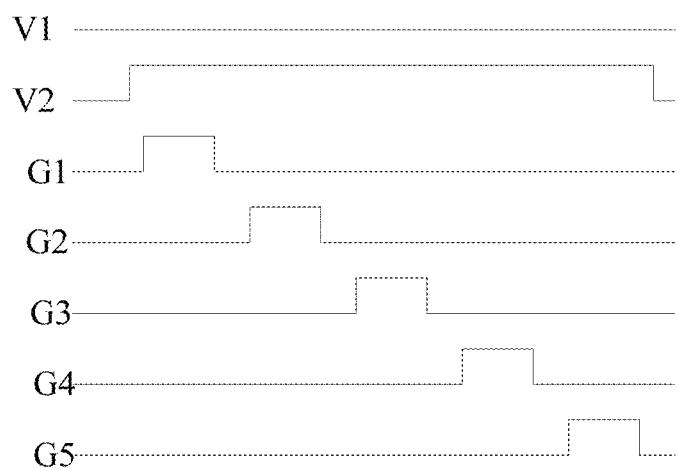
FIG. 12 is a timing chart corresponding to a driving method of an array substrate provided in some embodiments of the present disclosure.
Figure 13:
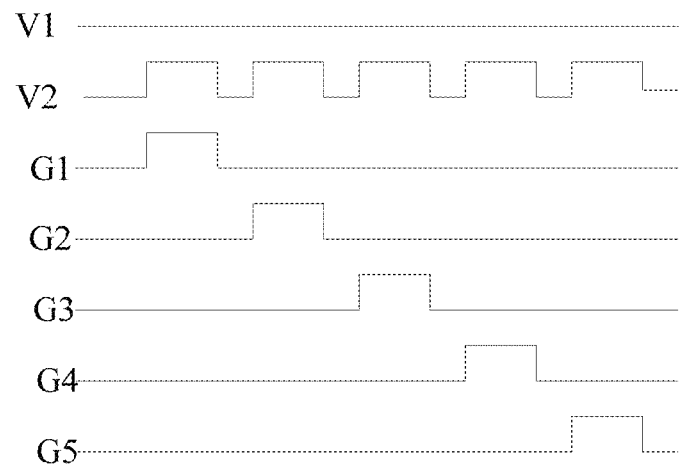
FIG. 13 is another timing chart corresponding to a driving method of an array substrate provided in some embodiments of the present disclosure.

A time chart corresponding to the driving method provided in an embodiment of the present disclosure is as shown in FIG. 12 and FIG. 13 respectively. FIG. 12 is a timing chart corresponding to the driving method of an array substrate according to one embodiment of the present disclosure, and FIG. 13 is a timing chart corresponding to a driving method of the array substrate according to another embodiment of the present disclosure. The scanning lines (illustrated with G1-G5 as an example) output scanning signals (meaning effective pulse signals) row by row. As shown in FIG. 12, reference voltage signal at a high level is continuously applied to the second reference voltage line V2 and reference voltage signal at a low level is continuously applied to the first reference voltage line V1 from the moment at which the first row of scanning line G1 begins to output scanning signal to the moment at which all the scanning lines stop outputting scanning signals. In some embodiments, as shown in FIG. 13, reference voltage signal at a high level is applied to the second reference voltage line V2 only when a mth row of scanning line Gm outputs a scanning signal.

In one embodiment, high-level reference voltage signal is applied to the first reference voltage line V1 only when a mth row of scanning line Gm outputs a scanning signal, thus power consumption of the pressure sensing panel can be reduced.

In some embodiments, in a driving method according to the present disclosure, a high-level reference voltage signal is applied to the first reference voltage line, and a low-level reference voltage signal is applied to the second reference voltage line, and this is not limited herein.

In some embodiments, in a driving method according to the present disclosure, as to the pressure sensing panel, in two arbitrary adjacent strain sensing units along the row direction, two cases as follows are considered. In one case, the second end of one first resistive pressure sensing electrode is electrically connected with the first reference voltage line, and the second end of the other first resistive pressure sensing electrode is electrically connected with the second reference voltage line. In another case, an extension direction of the first resistive pressure sensing electrode in one strain sensing unit is the same as an extension direction of the second resistive pressure sensing electrode in the other strain sensing unit. That is, in the two cases, two arbitrary adjacent strain sensing units along the row direction constitute a full-bridge type Wheatstone bridge structure, such as a pressure sensing panel shown in FIG. 2, then the step of determining deformation of a pressure sensing panel according to the voltage difference corresponding to each signal reading line obtained when each row of scanning line outputs the scanning signal includes:

calculating a difference of voltage differences corresponding to two arbitrary adjacent signal reading lines according to a voltage difference corresponding to each signal reading line obtained when each row of scanning line outputs a scanning signal; and determining deformation of the pressure sensing panel according to the difference of voltage differences corresponding to two arbitrary adjacent signal reading lines obtained through calculation.

In the above driving method, deformation of the pressure sensing panel is determined according to a difference of voltage differences corresponding to two arbitrary adjacent signal reading lines obtained through calculation, improving sensitivity of measurement.

Figure 14:
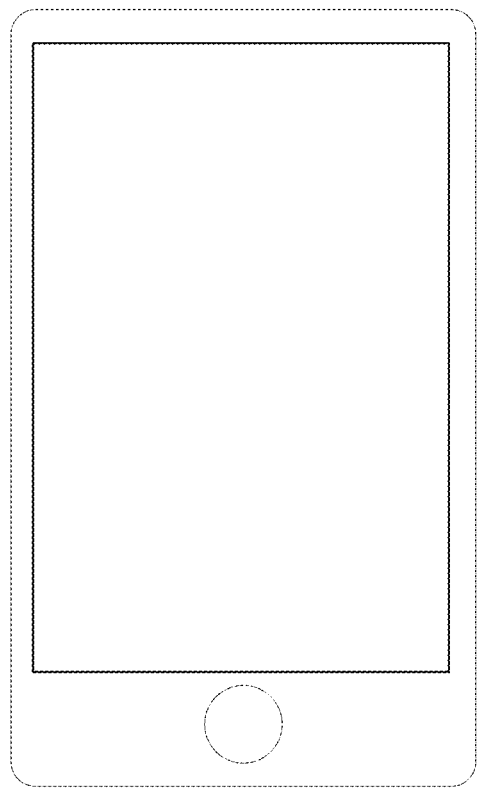
FIG. 14 is a structural schematic diagram of a display device provided in some embodiments of the present disclosure.

Based on the same inventive concept, an embodiment of the present disclosure further provides a display device, as shown in FIG. 14 which a structural schematic diagram of a display device provided in an embodiment of the present disclosure. The display device includes any of the above array substrate provided in the embodiments of the present disclosure. In one embodiment, the display device can be any flexible product or component with a display function, such as a mobile phone, a tablet computer, a television, a display, a notebook computer, a digital photo frame, and a navigator as shown in FIG. 14. Since principles of the display device in solving problems are similar to those of the above-mentioned array substrate, therefore, for the implementation of the display device, please refer to the implementation of the above array substrate, and the repeated part will not be repeated redundantly herein.

According to the above pressure sensing panel and the display device provided in the embodiments of the present disclosure, the strain sensing unit includes a switching transistor, a first resistive pressure sensing electrode and a second resistive pressure sensing electrode. The first reference voltage line and the second reference voltage line have a potential difference when the switching transistor is switched on. In this way, when the pressure sensing panel is deformed, the resistances of the first resistive pressure sensing electrode and the second resistive pressure sensing electrode change due to deformation of the first resistive pressure sensing electrode and the second resistive pressure sensing electrode at corresponding positions, which leads to a change in voltage between the first resistive pressure sensing electrode and the second resistive pressure sensing electrode. Then voltage signals output by the switching transistor through the signal reading line will change, and deformation of the pressure sensing panel can be obtained through analyzing the voltage signal output by the signal reading line. Moreover, since the first resistive pressure sensing electrode and the second resistive pressure sensing electrode are arranged on different flexible substrates, the directions at which two flexible substrates bear a stress during deformation are opposite, therefore, sensitivity of the strain sensing unit is relatively high. In addition, according to the pressure sensing panel provided in the embodiments of the present disclosure, deformation is detected by resistance change due to the deformation, and thus is not influenced by a magnetic field in surrounding environment. Besides, according to the pressure sensing panel provided in the embodiments of the present disclosure, the structure of the strain sensing unit is simple, and lightening and thinning of the pressure sensing panel can be realized.

What is claimed is:

1. A pressure sensing panel, comprising:
a first flexible substrate and a second flexible substrate disposed oppositely; and
a plurality of strain sensing units, a first reference voltage line, a second reference voltage line, signal reading lines and scanning lines, all of which are disposed on a side, facing the second flexible substrate, of the first flexible substrate or disposed on a side of the second flexible substrate facing the first flexible substrate;
wherein the plurality of strain sensing units are arranged in a matrix, each of the signal reading lines is electrically connected with each column of strain sensing units in a one-to-one corresponding manner, and each of the scanning lines is electrically connected with each row of strain sensing units in a one-to-one corresponding manner;
each of the plurality of strain sensing unit comprises: a switching transistor, a first resistive pressure sensing electrode and a second resistive pressure sensing electrode;
a first end of the first resistive pressure sensing electrode is respectively electrically connected with a first end of the second resistive pressure sensing electrode and a first electrode of the switching transistor; one of a second end of the first resistive pressure sensing electrode and a second end of the second resistive pressure sensing electrode is electrically connected with the first reference voltage line, other one of the second end of the first resistive pressure sensing electrode and the second end of the second resistive pressure sensing electrode is electrically connected with the second reference voltage line; a gate of the switching transistor is electrically connected with a corresponding scanning line, and a second electrode of the switching transistor is electrically connected with a corresponding signal reading line;
the first electrode is a source, and the second electrode is a drain; or, the first electrode is a drain, and the second electrode is a source;
a potential difference exists between the first reference voltage line and the second reference voltage line when the switching transistor is switched on; and
in each of the plurality of strain sensing units, the first resistive pressure sensing electrode is arranged on the side of the first flexible substrate facing the second flexible substrate, and the second resistive pressure sensing electrode is arranged on the side, facing the first flexible substrate, of the second flexible substrate.

2. The pressure sensing panel of claim 1, wherein the first resistive pressure sensing electrode and the second resistive pressure sensing electrode are respectively disposed at a first and second side of a neutral surface of the pressure sensing panel.

3. The pressure sensing panel of claim 1, wherein
in each of the plurality of strain sensing units, an extension direction of the first resistive pressure sensing electrode is in parallel with an extension direction of the second resistive pressure sensing electrode.

4. The pressure sensing panel of claim 3, wherein
in each of the plurality of strain sensing units, an orthographic projection of the first resistive pressure sensing electrode on the first flexible substrate and an orthographic projection of the second resistive pressure sensing electrode on the first flexible substrate have an overlapping field.

5. The pressure sensing panel of claim 1, wherein
in two arbitrary adjacent strain sensing units along a row direction, a second end of a first resistive pressure sensing electrode in one of the two arbitrary adjacent strain sensing units is electrically connected with the first reference voltage line, and a second end of a first resistive pressure sensing electrode in other one of the two arbitrary adjacent strain sensing units is electrically connected with the second reference voltage line.

6. The pressure sensing panel of claim 1, further comprising:
- a first electrode lapping part which is arranged at the side of the first flexible substrate facing the second flexible substrate and which is electrically connected with the first end of the first resistive pressure sensing electrode;
- a second electrode lapping part which is arranged at the side of the second flexible substrate facing the first flexible substrate and which is electrically connected with the first end of the second resistive pressure sensing electrode; and
- conductive adhesive which is arranged between the first electrode lapping part and the second electrode lapping part and which electrically connects the first electrode lapping part and the second electrode lapping part.

7. The pressure sensing panel of claim 6, wherein
Young modulus of the conductive adhesive is respectively smaller than that of the first flexible substrate and that of the second flexible substrate.

8. The pressure sensing panel of claim 6, wherein
an orthographic projection of the first electrode lapping part on the first flexible substrate overlaps with an orthographic projection of the second electrode lapping part on the first flexible substrate.

9. The pressure sensing panel of claim 1, wherein
materials of the first resistive pressure sensing electrode and the second resistive pressure sensing electrode are both low-temperature polysilicon materials.

10. The pressure sensing panel of claim 9, wherein
the switching transistor is arranged at the side of the first flexible substrate facing the second flexible substrate;
material of an active layer of the switching transistor is low-temperature polysilicon material; and
the active layer and the first resistive pressure sensing electrode are arranged in a same layer.

11. The pressure sensing panel of claim 10, wherein
a reference voltage line which is electrically connected with the second end of the first resistive pressure sensing electrode, the signal reading lines and the scanning lines are located on the side of the first flexible substrate facing the second flexible substrate;
a reference voltage line connected with a first resistive pressure sensing electrode, the first electrode of the switching transistor and the second electrode of the switching transistor are set to be in a same layer and of a same material.

12. The pressure sensing panel of claim 11, further comprising:
- a first inorganic insulating layer which is arranged on the side of the first flexible substrate facing the second flexible substrate, wherein surface of a function layer is covered by the first inorganic insulating layer, and the first inorganic insulating layer has a pattern which is matched with that of the function layer, and the function layer includes the first resistive pressure sensing electrode and the active layer;
- a first organic insulating layer which is filled in blank areas in the first inorganic insulating layer and which covers the first inorganic insulating layer;
- wherein the reference voltage line electrically connected with the second end of the first resistive pressure sensing electrode, the first electrode of the switching transistor and the second electrode of the switching transistor are respectively connected with a corresponding function layer through a via hole which penetrates through the first organic insulating layer and the first inorganic insulating layer.

13. The pressure sensing panel of claim 12, wherein
the first reference voltage line, the second reference voltage line and the signal reading lines all extend along a column direction;
each column of strain sensing units respectively corresponds to a first reference voltage line and a second reference voltage line.

14. The pressure sensing panel of claim 13, wherein
the reference voltage line which is arranged on the side of the first flexible substrate facing the second flexible substrate and the signal reading lines are set to be in a same layer and of a same material.

15. The pressure sensing panel of claim 14, further comprising:
- a second organic insulating layer which covers the reference voltage line, the signal reading lines, the first electrode of the switching transistor and the second electrode of the switching transistor on the first flexible substrate;
- when the pressure sensing panel further includes a first electrode lapping part, the first electrode lapping part is arranged on a side of the second organic insulating layer facing the second flexible substrate, and the first electrode lapping part is electrically connected with the first electrode of the switching transistor through a via hole which penetrates through the second organic insulating layer.

16. The pressure sensing panel of claim 9, further comprising:
- a second inorganic insulating layer which is arranged at the side of the second flexible substrate facing the first flexible substrate, wherein surface of the second resistive pressure sensing electrode is covered by the second inorganic insulating layer, and the second inorganic insulating layer has a pattern which is matched with that of the second resistive pressure sensing electrode;
- a third organic insulating layer which is filled in blank areas in the second inorganic insulating layer and which covers the second inorganic insulating layer;
- wherein a reference voltage line electrically connected with the second end of the second resistive pressure sensing electrode is arranged on a side of the third organic insulating layer facing away from the second flexible substrate, and the reference voltage line electrically connected with the second end of the second resistive pressure sensing electrode is connected with the second resistive pressure sensing electrode through a via hole which penetrates through the third organic insulating layer and the second inorganic insulating layer.

17. The pressure sensing panel of claim 16, wherein
when the pressure sensing panel comprises a second electrode lapping part, the pressure sensing panel further comprises:
- an electrode connecting part which is arranged to be in a same layer as the reference voltage line which is electrically connected with the second end of the second resistive pressure sensing electrode, wherein the electrode connecting part is connected with the second resistive pressure sensing electrode through a via hole which penetrates through the third organic insulating layer and the second inorganic insulating layer;
- a fourth organic insulating layer which covers the electrode connecting part and covers the reference voltage line which is electrically connected with the second end of the second resistive pressure sensing electrode;

wherein the second electrode lapping part is arranged at a side of the fourth organic insulating layer facing away from the second flexible substrate, and the second electrode lapping part is electrically connected with the electrode connecting part through a via hole which penetrates through the fourth organic insulating layer.

18. The pressure sensing panel of claim 1, further comprising:
a display panel;
wherein the display panel is arranged on a side of the first flexible substrate facing away from the second flexible substrate, or, the display panel is arranged on a side of the second flexible substrate facing away from the first flexible substrate.

19. A display device, comprising a pressure sensing panel, wherein the pressure sensing panel, comprising:
a first flexible substrate and a second flexible substrate disposed oppositely; and
a plurality of strain sensing units, a first reference voltage line, a second reference voltage line, signal reading lines and scanning lines, all of which are disposed on a side of the first flexible substrate facing the second flexible substrate or disposed on a side of the second flexible substrate facing the first flexible substrate;
wherein the plurality of strain sensing units are arranged in a matrix, each of the signal reading lines is electrically connected with each column of strain sensing units in a one-to-one corresponding manner, and each of the scanning lines is electrically connected with each row of strain sensing units in a one-to-one corresponding manner;
each of the plurality of strain sensing unit comprises: a switching transistor, a first resistive pressure sensing electrode and a second resistive pressure sensing electrode;
a first end of the first resistive pressure sensing electrode is respectively electrically connected with a first end of the second resistive pressure sensing electrode and a first electrode of the switching transistor; one of a second end of the first resistive pressure sensing electrode and a second end of the second resistive pressure sensing electrode is electrically connected with the first reference voltage line, other one of the second end of the first resistive pressure sensing electrode and the second end of the second resistive pressure sensing electrode is electrically connected with the second reference voltage line; a gate of the switching transistor is electrically connected with a corresponding scanning line, and a second electrode of the switching transistor is electrically connected with a corresponding signal reading line;
the first electrode is a source, and the second electrode is a drain; or, the first electrode is a drain, and the second electrode is a source;
a potential difference exists between the first reference voltage line and the second reference voltage line when the switching transistor is switched on; and
in each of the plurality of strain sensing units, the first resistive pressure sensing electrode is arranged on the side of the first flexible substrate facing the second flexible substrate, and the second resistive pressure sensing electrode is arranged on the side of the second flexible substrate facing the first flexible substrate.

* * * * *